United States Patent [19]
Richards et al.

[11] Patent Number: 5,787,774
[45] Date of Patent: Aug. 4, 1998

[54] BANDSAW APPARATUS WITH PIVOTALLY-MOUNTED SAW HEAD ASSEMBLY ARM AND METHOD

[75] Inventors: Mark P. Richards, Chouteau; Richard H. Porterfield, Pryor, both of Okla.

[73] Assignee: HEM, Inc., Pryor, Okla.

[21] Appl. No.: 939,722

[22] Filed: Oct. 3, 1997

Related U.S. Application Data

[60] Continuation of Ser. No. 620,116, Mar. 21, 1996, abandoned, which is a division of Ser. No. 331,061, Oct. 28, 1994, Pat. No. 5,526,727.

[51] Int. Cl.$^6$ ................................................. B23D 53/04
[52] U.S. Cl. .................................. 83/13; 83/798; 83/788; 83/859; 83/954
[58] Field of Search ................................. 83/13, 788, 859, 83/564, 794, 796, 797, 798, 954, 428

[56] References Cited

U.S. PATENT DOCUMENTS

| | | | |
|---|---|---|---|
| 2,650,521 | 9/1953 | Steinbrecker | 409/235 |
| 3,350,969 | 11/1967 | Wiatt et al. | 83/428 |
| 3,548,697 | 12/1970 | Gerber et al. | 83/428 |
| 3,575,074 | 4/1971 | Aizawa | 83/564 |
| 3,682,030 | 8/1972 | Harris | 83/201.04 |
| 3,730,033 | 5/1973 | Aizawa | 83/13 |
| 3,848,493 | 11/1974 | Harris | 83/168 |
| 3,975,978 | 8/1976 | Cleland | 83/798 |
| 4,170,915 | 10/1979 | Sato | 83/13 |
| 4,358,974 | 11/1982 | Sakurai | 83/13 |
| 4,364,294 | 12/1982 | Eccardt | 83/799 |
| 4,479,410 | 10/1984 | Taguchi | 83/796 |
| 4,481,845 | 11/1984 | Sakurai et al. | 83/13 |
| 4,481,849 | 11/1984 | Aoyagi | 83/796 |
| 4,632,615 | 12/1986 | Yamamura | 409/235 |
| 4,700,596 | 10/1987 | Taguchi | 83/13 |
| 5,072,507 | 12/1991 | Meeks | 83/564 |
| 5,081,890 | 1/1992 | Stolzer | 83/796 |
| 5,341,712 | 8/1994 | D'Arcy | 83/808 |
| 5,344,264 | 9/1994 | Hevoyan | 409/235 |

FOREIGN PATENT DOCUMENTS

| | | | |
|---|---|---|---|
| 0 136 717 | 6/1986 | Japan | 83/788 |
| 0 162 426 | 3/1958 | Sweden | 83/788 |

Primary Examiner—M. Rachuba
Assistant Examiner—Sean A. Pryor
Attorney, Agent, or Firm—Flehr Hohbach Test Albritton & Herbert LLP

[57] ABSTRACT

A method and bandsaw apparatus (30) which facilitates maintenance access to a continuous loop bandsaw blade (43) rotatably mounted thereon. The bandsaw apparatus (30) includes a base frame (31) and a cutting table (32) supported on top of the frame (31) to provide a cutting surface (33). A saw carriage assembly (37) is provided including a saw arm assembly (37) rotatably supporting the saw blade (43) which extends through a blade receiving slot (34) in the table (32). A support frame (42) movably mounted to a guide assembly (44) enables selective reciprocating movement of the saw arm assembly (40) relative the cutting table (32) so that the blade (43) can move along the receiving slot (34). A coupling device (45) of the carriage assembly (37) movably couples the saw arm assembly (40) to the support frame (42) for movement of the saw arm assembly (40) between a cutting position and a maintenance access position. In the maintenance access position, when the carriage assembly (37) is positioned at the table second end (36), the saw arm assembly (40) can be moved away from the cutting table (32) which further moves the bandsaw blade (43) to a position outwardly of the slot (34). This substantially enhances access to the blade drive wheels (41, 41') and the blade (43).

9 Claims, 12 Drawing Sheets

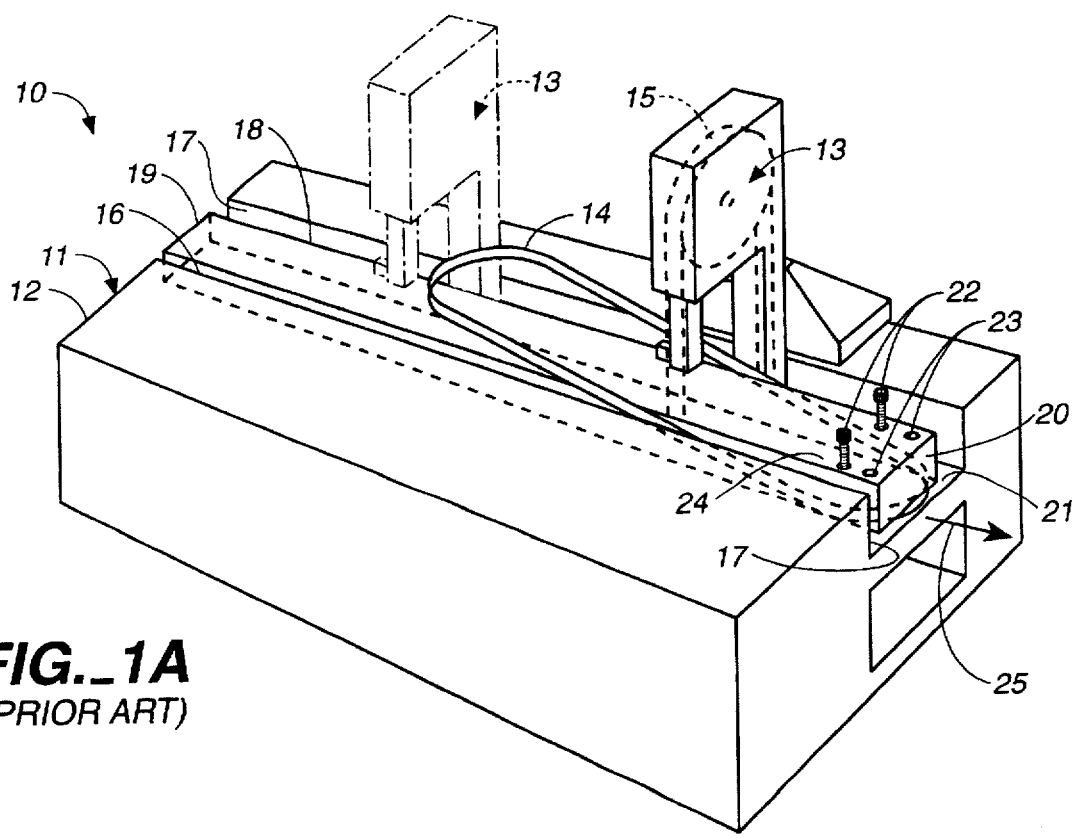
FIG._1A
*(PRIOR ART)*
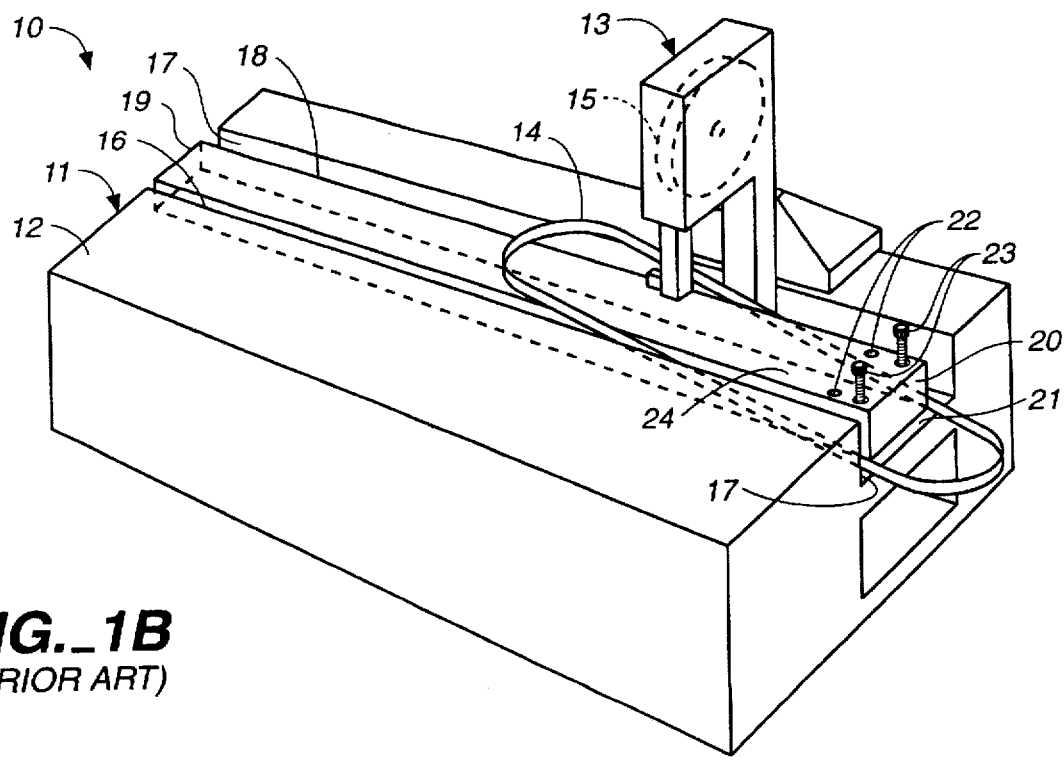
FIG._1B
*(PRIOR ART)*

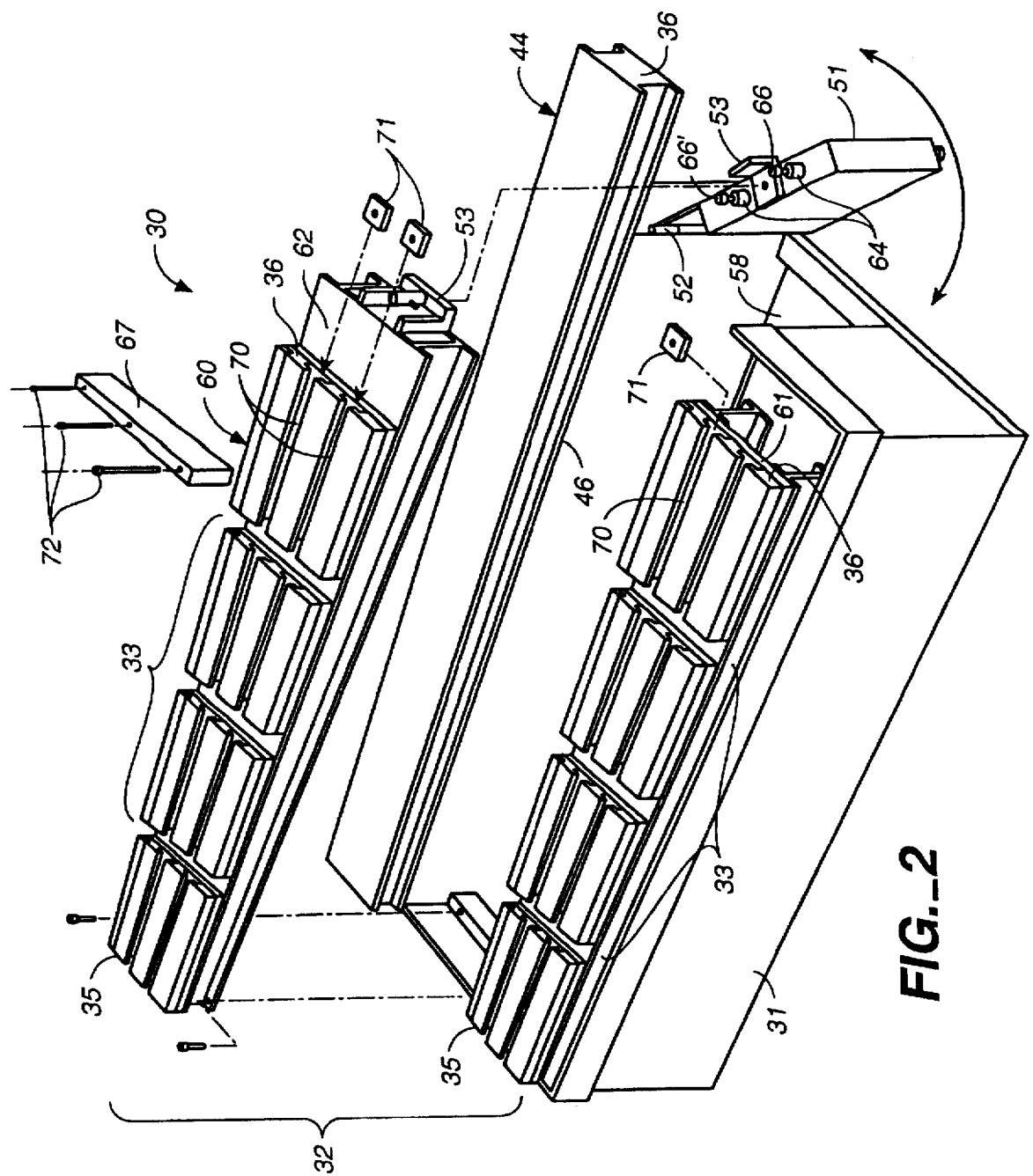
FIG._2

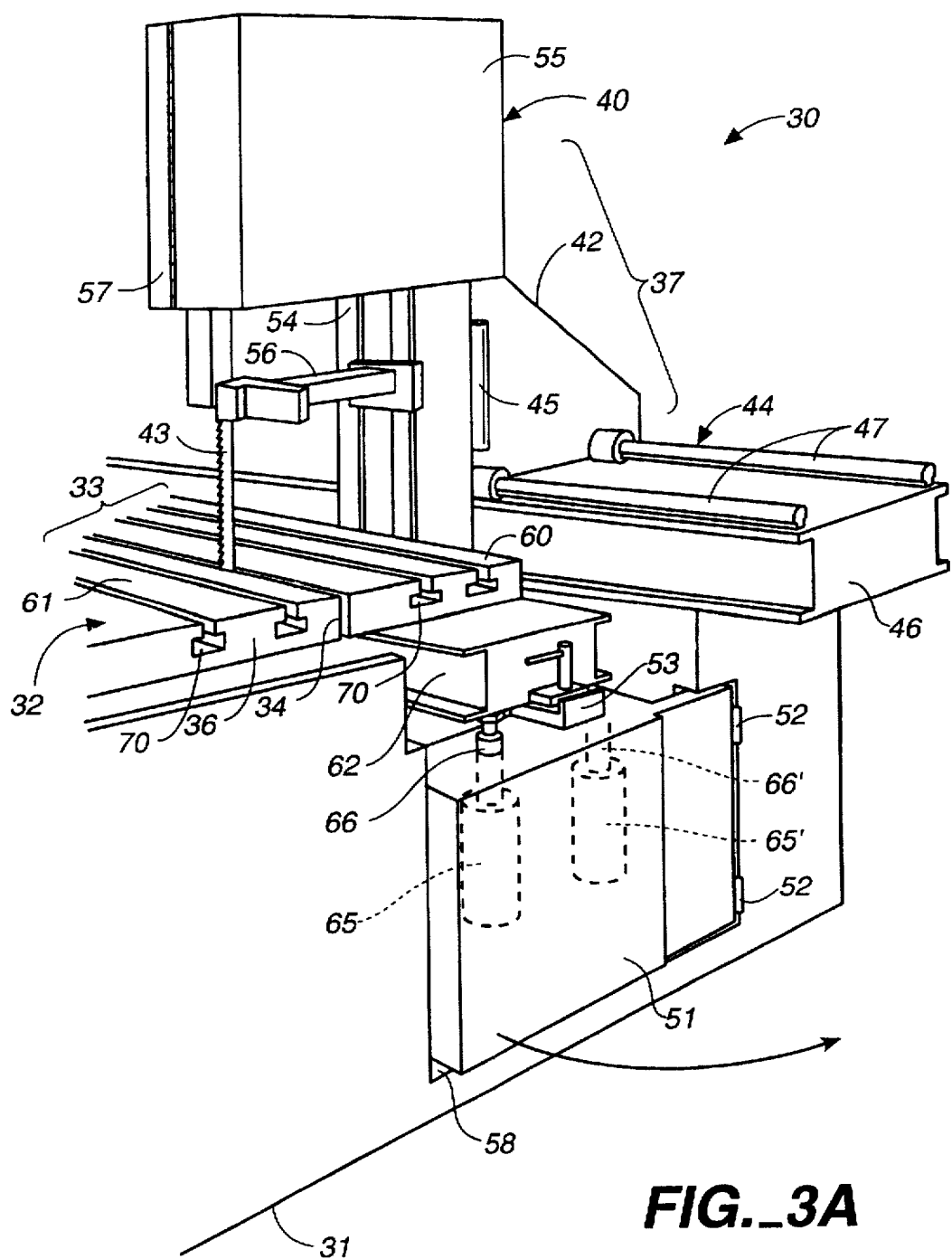
FIG._3A

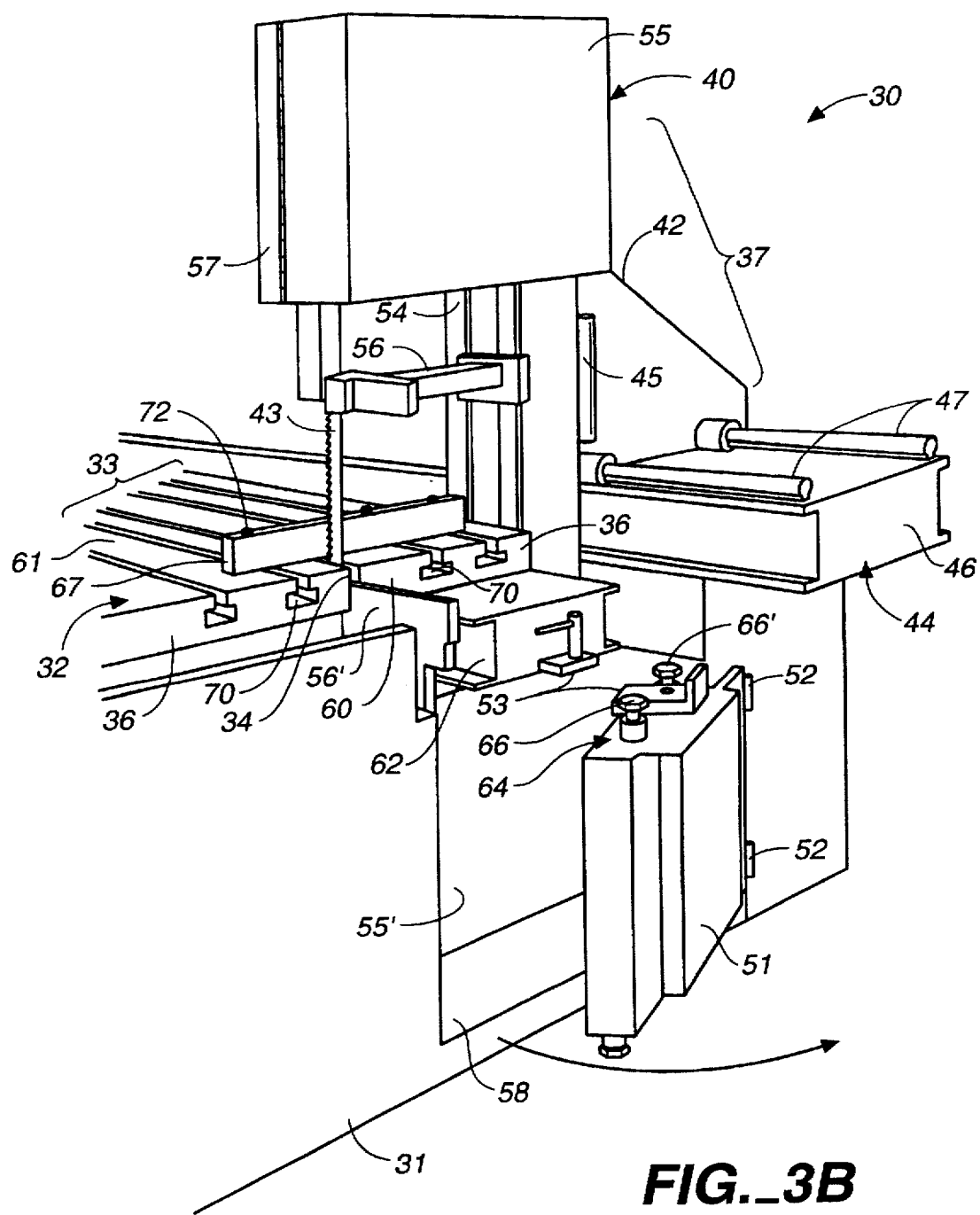
FIG._3B

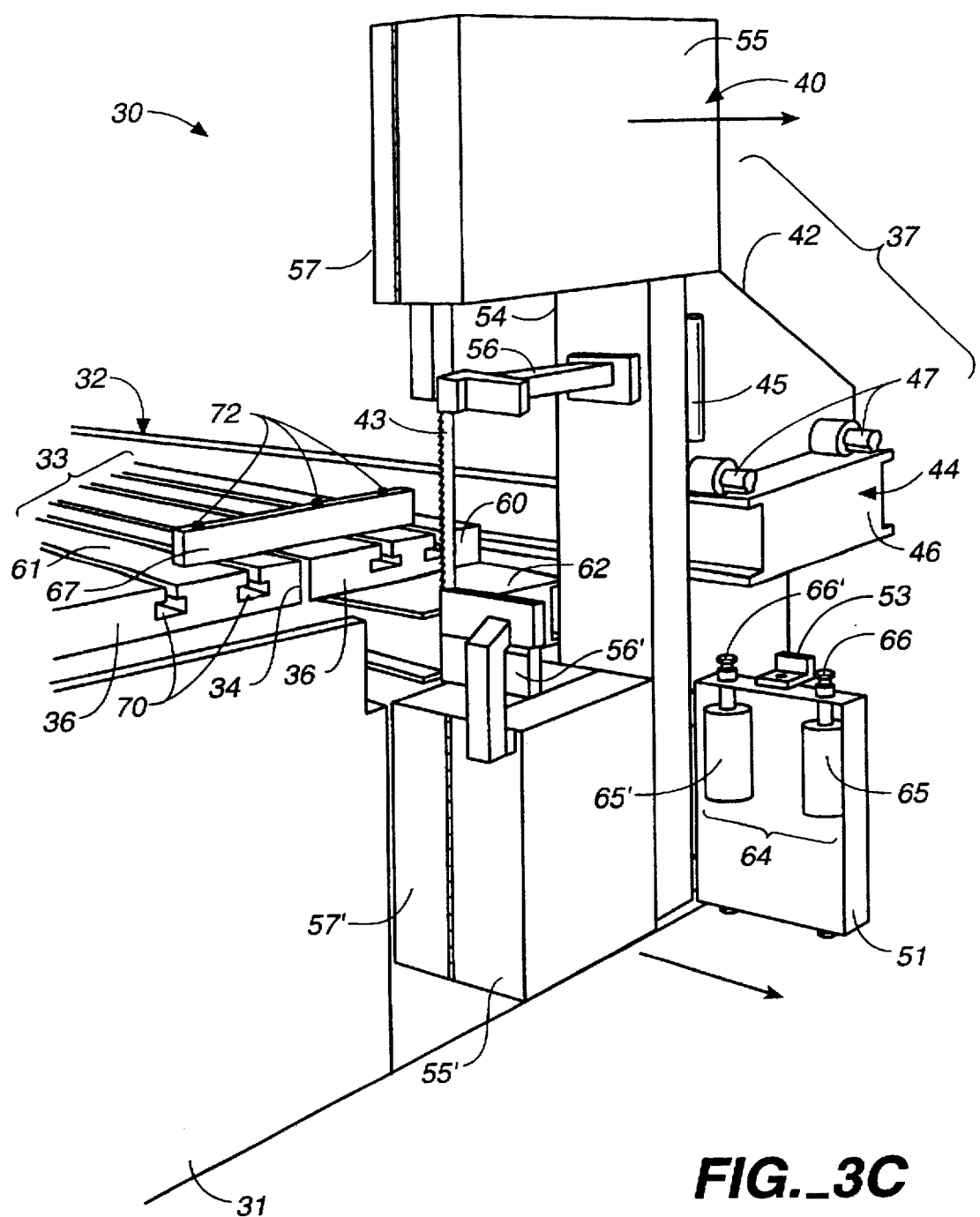
FIG._3C

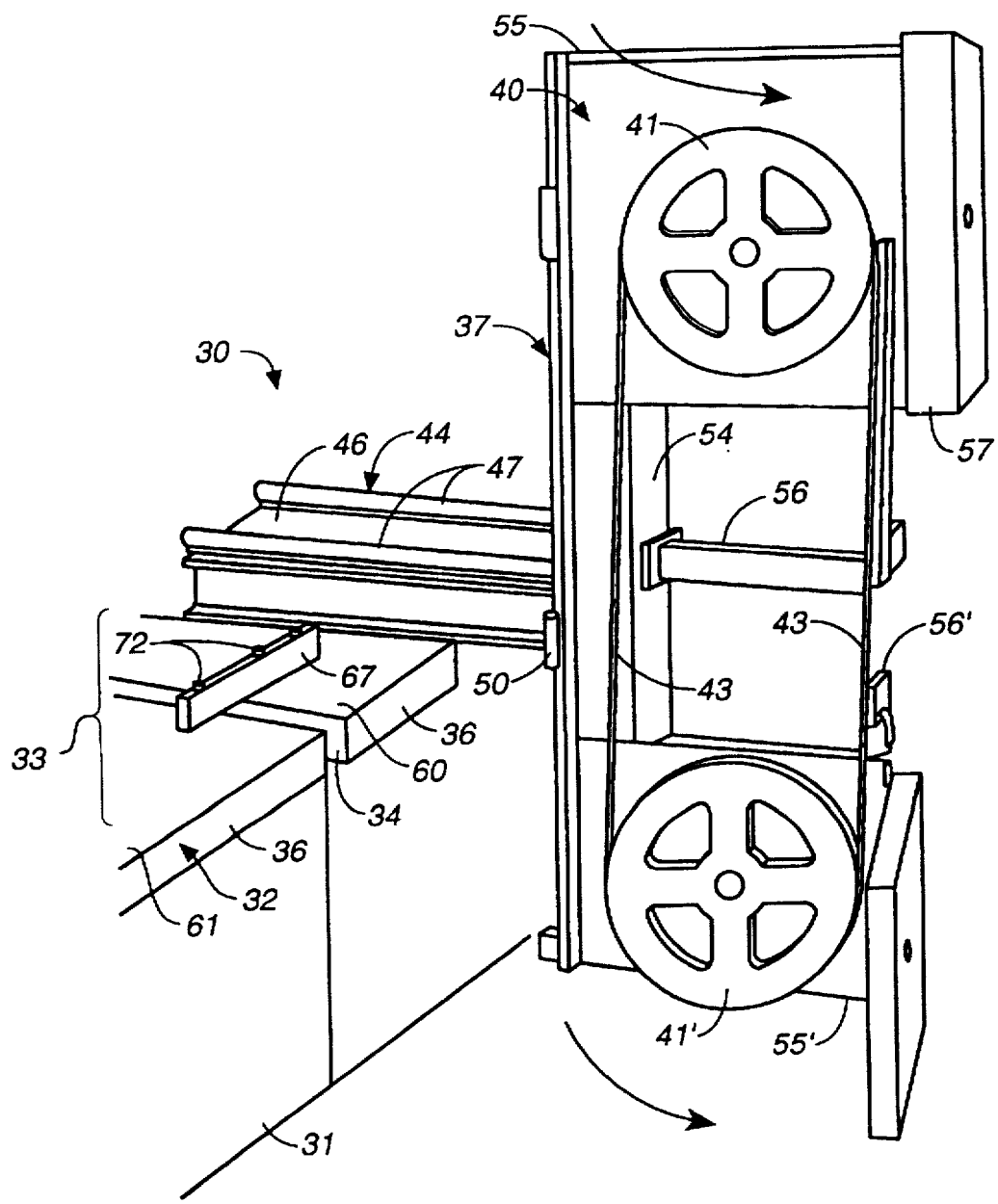
FIG._3D

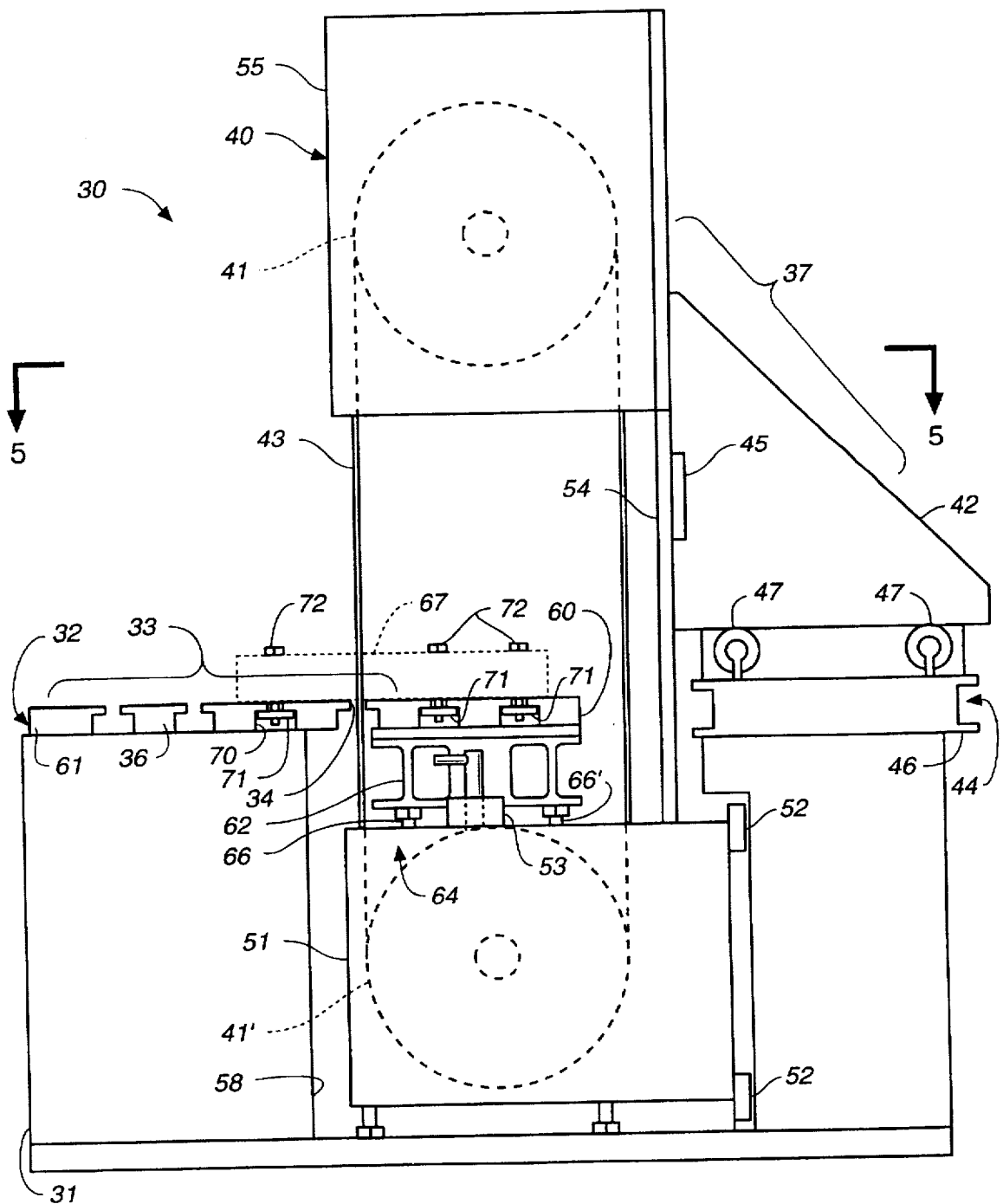
FIG._4

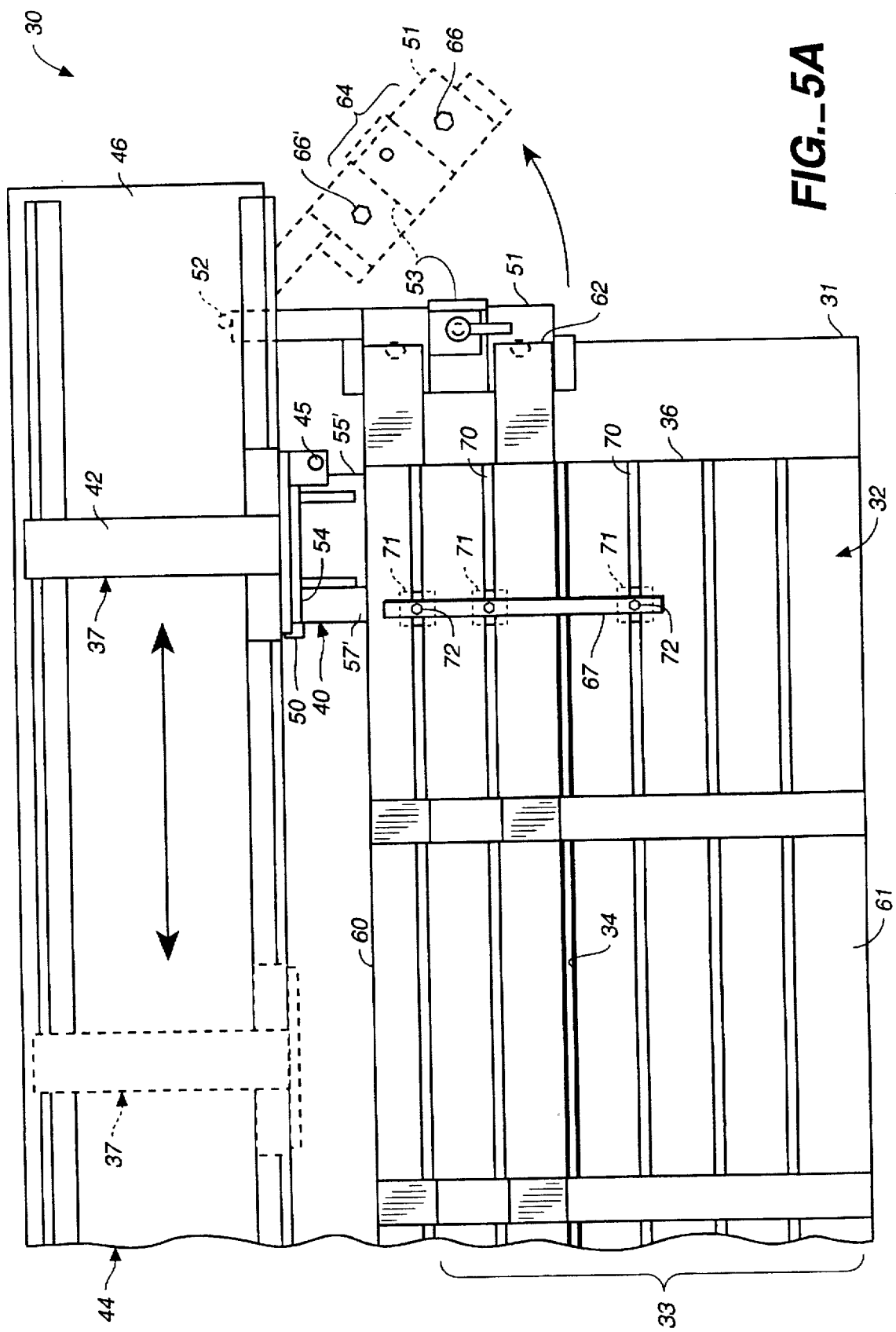

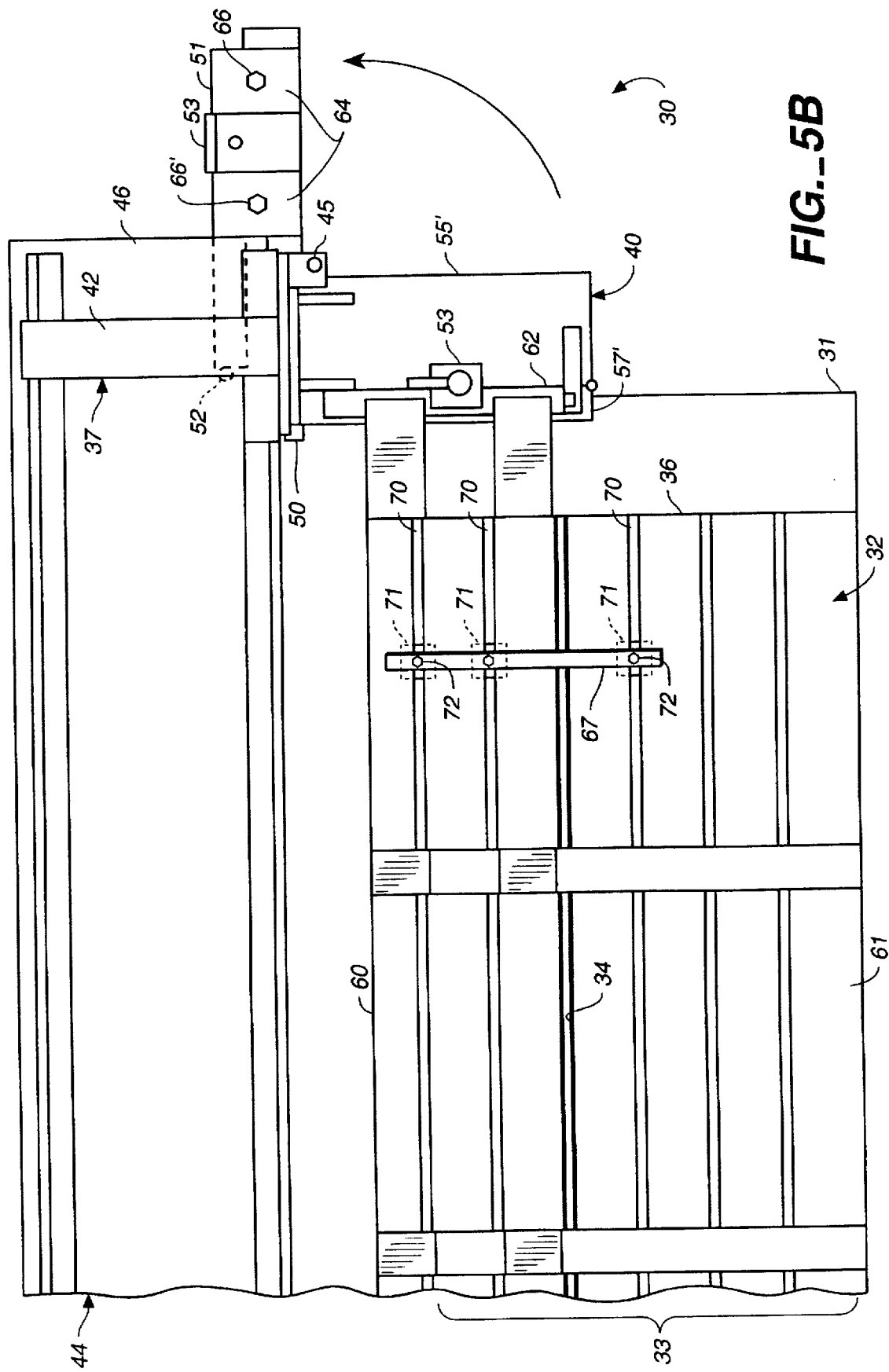

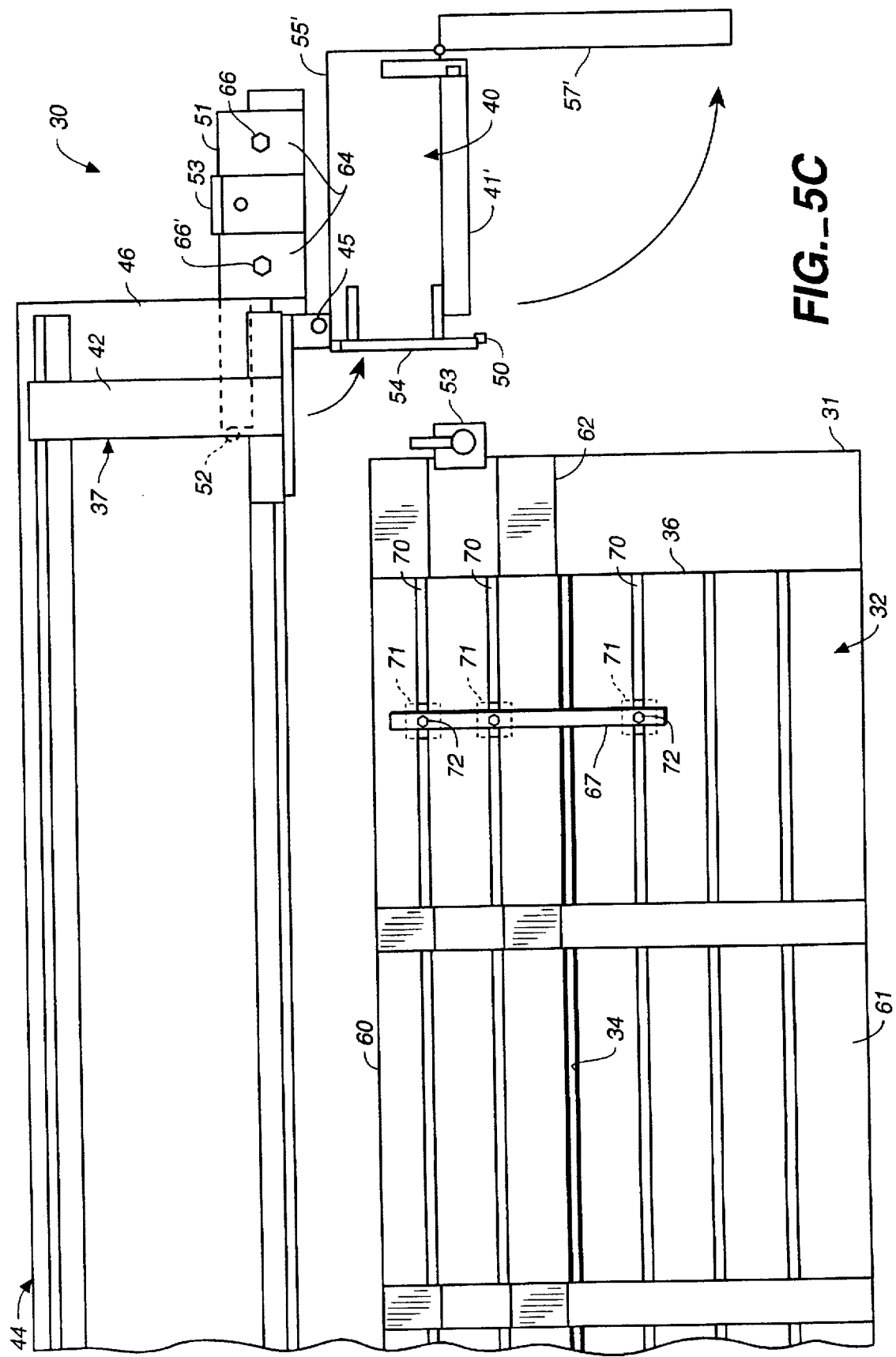
FIG._5C

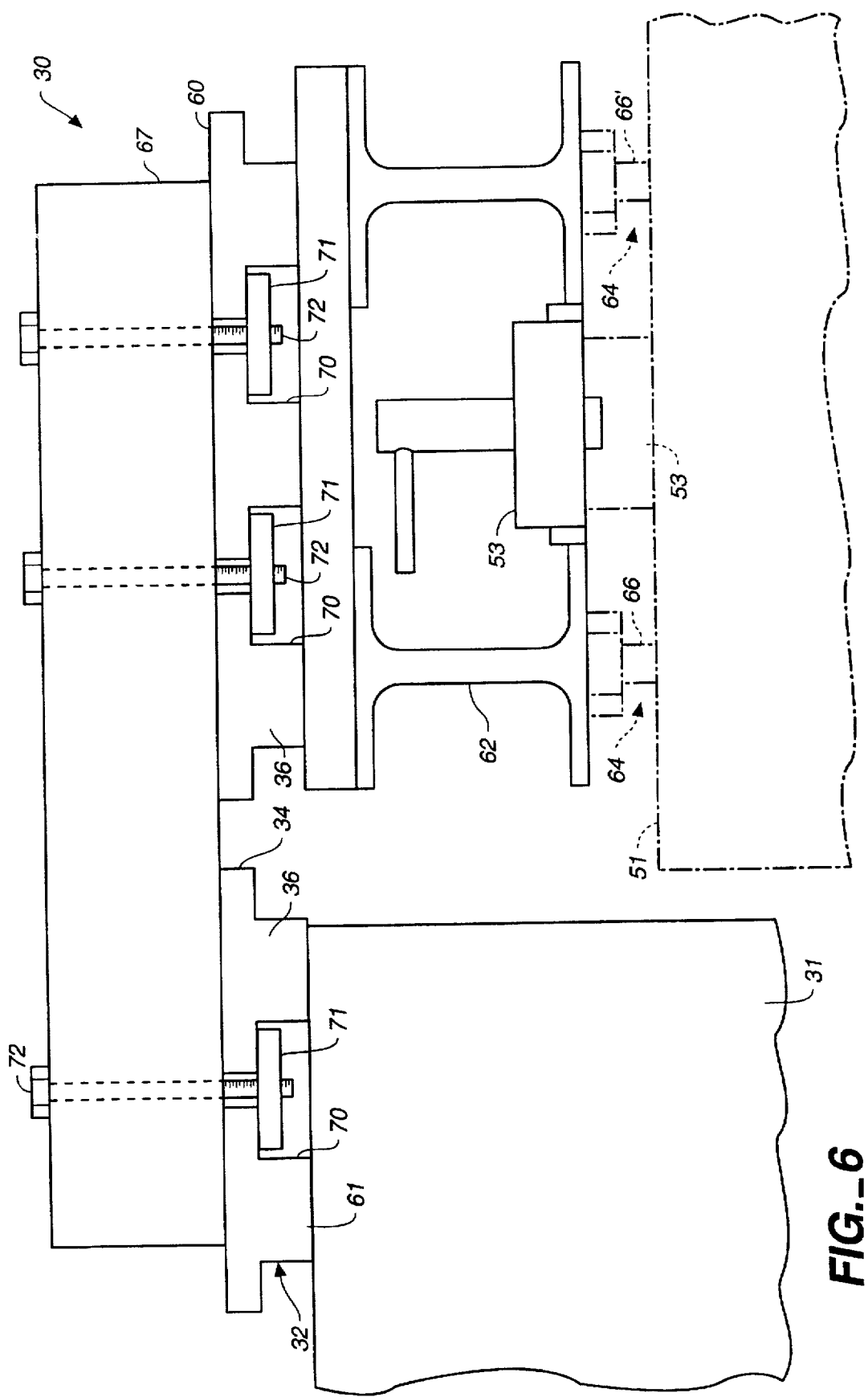
FIG._6

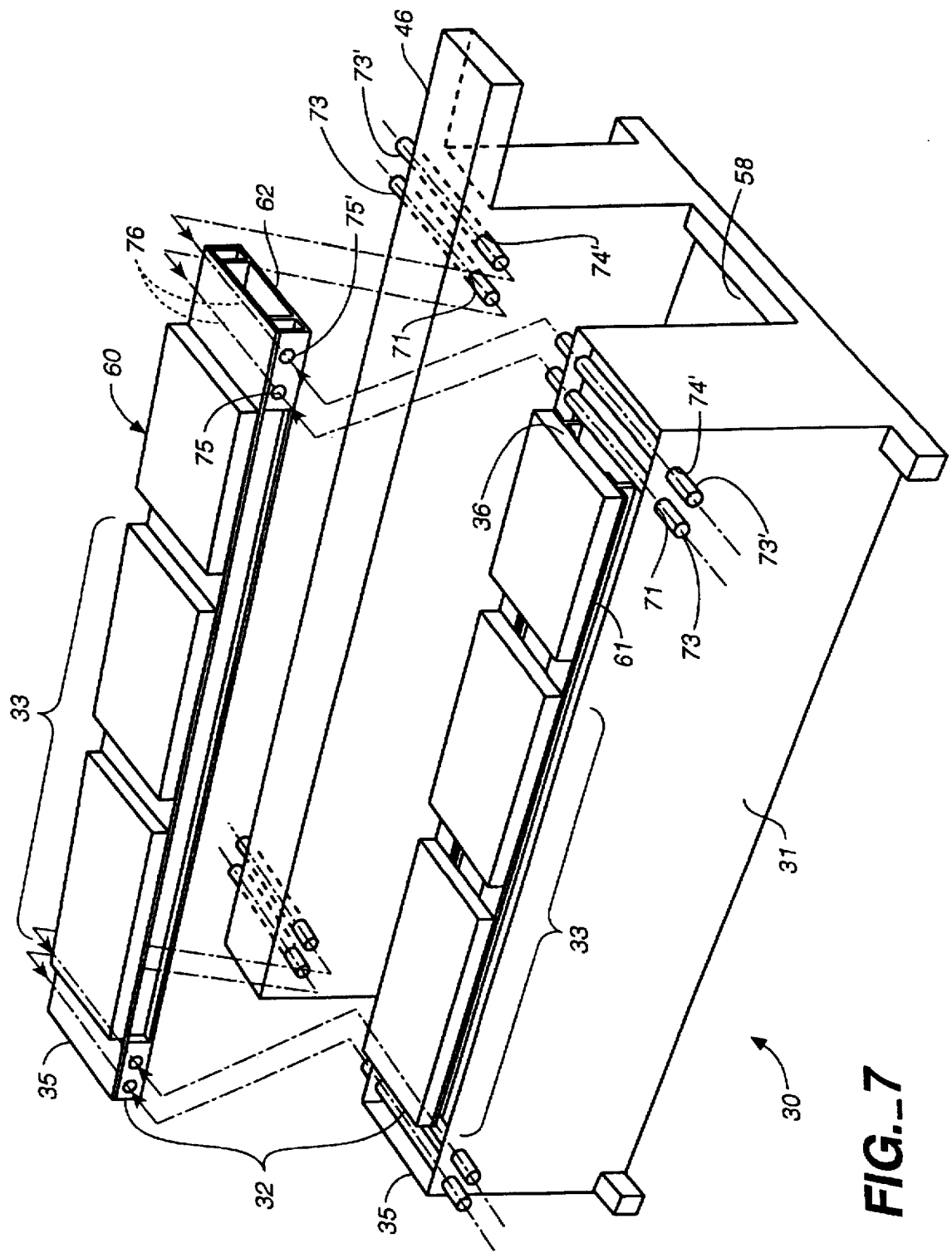

1

BANDSAW APPARATUS WITH PIVOTALLY-MOUNTED SAW HEAD ASSEMBLY ARM AND METHOD

This is a continuation of application Ser. No. 08/620,116 filed Mar. 21, 1996, now abandoned which is a divisional of application Ser. No. 08/331,061 filed Oct. 28, 1994, now U.S. Pat. No. 5,526,727.

TECHNICAL FIELD

The present invention relates, generally, to a band saw apparatus employing a rotating continuous loop saw blade, and, more particularly, relates to a band saw apparatus and method for facilitating replacement of the continuous loop saw blade in the band saw apparatus.

BACKGROUND ART

Precision longitudinal cutting of large, elongated, workpiece sheets or plates typically is accomplished by gripping the workpiece in a vise assembly and cutting the same with a cutting device, such as a band saw. Conventional plate band saw apparatus 10, as shown in FIGS. 1A and 1B, includes a base fixture or cutting table 11 having a generally planar support surface 12 upon which the elongated workpieces to be cut (not shown) are supported. Further, band saw apparatus 10 includes a saw carriage assembly 13 movable in a longitudinal direction along th e base fixture. Saw carriage assembly 13 houses a flexible continuous loop saw blade 14 (shown in phantom in FIG. 1A) which is mounted around at least two wheels or pulleys 15, one of which is driven. Typically, two or more blade guide assemblies are mounted to saw carriage assembly 13 between the wheels and slidably engage the saw blade to orient it in a cutting orientation. The section of saw blade 14 intermediate the saw blade guide assemblies is called the "cutting stretch".

During motion or advancement of the blade, either the bandsaw blade and/or the workpiece is displaced relative to the other along a guided path known as the "cutting line" which is the center line of the desired line of cut. Typically, however, in bandsaw apparatus specifically suited for cutting elongated plate workpieces along the longitudinal direction thereof, saw carriage assembly 13 is arranged to be moved longitudinally along the cutting table in the direction of arrows 16 to engage the workpiece by suitable drive means. Thus, in these cutting operations, the saw carriage assembly is longitudinally displaced along the cutting table, which moves the cutting stretch and hence the saw blade along the cutting line.

To enable movement of the continuous loop blade longitudinally along the cutting table, an elongated blade receiving slot 16 is formed in support surface 12, coincident with the "cutting line", which receives the rotating blade therethrough. This permits the carriage assembly, and hence, blade 14, to freely reciprocate along slot 16 without any interference of the blade with the table.

Receiving slot 16 extends through support surface 12, and is formed between a substantially vertical wall of a longitudinal channel 17 in base cutting table 11 and an elongated central beam 18 received in channel 17. Further, a top surface of central beam 18 and a top surface of the base fixture collectively form support surface 12. Normally, one end 19 of central beam 18 is fixedly mounted to cutting table 11, while an opposite end 20 is movably supported atop a bottom wall 21 of channel 17 through two sets of jack screws 22 and 23, the distal ends thereof which contact the bottom wall to elevate or raise the top surface of central beam 18. This arrangement enables maintenance replacement of the loop blade, as well as leveling of the support surface.

In recent years, considerable effort has been directed toward enhancing the cutting efficiency and precision of band saws. While these goals have been accomplished for the most part, one reoccurring problem often encountered with these conventional band saw apparatus is that access to the continuous loop blade for maintenance and replacement purposes is extremely limited. Due to the nature and arrangement of the cutting table, and the elongated slot, the installation and removal of the blade is a time consuming and laborious practice.

Typically, as illustrated in FIG. 1A, the loop blade 14 is removed from the wheels so that an end of blade 14 can be slid along the interspace between central beam 18 and base fixture channel 17. The first set of jack screws 22 is unscrewed or loosened to a raised position (FIG. 1A) which severs supportive contact between the distal ends thereof and the channel bottom wall 21. This causes all the suspension weight of the central beam to shift to second set of jack screws 23. Band saw blade 14 is then allowed to pass into a "capture zone" 24 between the first set and the second set of jack screws.

Subsequently, the first set of jack screws 22 is reengaged with the central beam for supportive contact with bottom wall 21. The second set of jack screws 23, hence, can be removed or unscrewed to a raised position (FIG. 1B) which similarly causes all the suspension weight of the central beam to shift back to first set of jack screws 22. This opens the other side of the "capture zone" so that bandsaw blade 14 can be retrieved therefrom. During installation of the loop bandsaw blade, the reverse procedure is applied.

This rather primitive sequence or series of steps is quite laborious and time consuming for technicians to exercise. Such practice causes production downtime to increase, which is especially critical in situations where the loop saw blades need to be replaced frequently.

DISCLOSURE OF INVENTION

Accordingly, it is an object of the present invention to provide a bandsaw apparatus and method for cutting elongated workpieces longitudinally thereof.

It is another object of the present invention to provide a bandsaw apparatus and method which facilitates replacement and maintenance of the continuous loop blades.

Another object of the present invention is to provide a bandsaw apparatus and method which increases cutting productivity.

Still another object of the present invention to provide a bandsaw apparatus and method which provides increased access to the saw carriage assembly components for maintenance.

It is a further object of the present invention to provide a bandsaw apparatus and method for cutting workpieces which is durable, compact, easy to maintain, has a minimum number of components, is easy to use, and is economical to manufacture.

The present invention includes a bandsaw apparatus having a base frame and a base fixture or cutting table supported on top of the frame to provide a cutting surface. A blade receiving slot extends along a longitudinal direction of the cutting table from a first end of the table to and terminating at a second end thereof. A guide assembly is mounted adjacent the cutting table and extends substantially from the first end to the second end of the table. Further, a saw carriage assembly is provided including a saw arm assembly having at least two spaced-apart, aligned wheels rotatably mounted thereto, and a continuous loop bandsaw blade mounted to and distended between the aligned wheels to form a cutting stretch extending through the slot. A support frame movably mounted to the guide assembly enables selective reciprocating movement of the saw arm assembly relative the cutting table so that the cutting stretch of the blade can move along the table slot. The bandsaw apparatus of the present invention further includes a coupling device which movably couples the saw arm assembly to the support frame for movement of the saw arm assembly between a cutting position and a maintenance access position. In the cutting position, the saw carriage assembly can reciprocate between the first end and the second end of the cutting table during cutting of a workpiece. In the maintenance access position, when the carriage assembly is positioned at the table second end, the saw arm assembly can be moved away from the cutting table which further moves the bandsaw blade to a position outwardly of the slot. This substantially enhances access to the wheels and the blade.

The present invention includes a method for accessing the continuous loop bandsaw blade including the step of moving the saw carriage assembly away from the base frame in a manner moving the saw blade out of the receiving slot and away from the base frame by an amount sufficient to perform maintenance tasks to the blade and other saw carriage assembly components.

Accordingly, the present invention provides a method and apparatus for cutting workpieces which facilitates maintenance access to the continuous loop band saw blade by moving a portion of the saw carriage assembly, and hence the blade, away from the cutting table and out of the blade receiving slot.

BRIEF DESCRIPTION OF THE DRAWING

The purpose and advantages of the present invention will be apparent to those skilled in the art from the following detailed description in conjunction with the appended drawings in which:

FIGS. 1A and 1B are a series of top perspective views of a prior art band saw apparatus illustrating removal of the continuous loop band saw blade.

FIG. 2 is an exploded, top perspective view of a band saw apparatus constructed in accordance with the present invention showing pivotal movement of a base door.

FIGS. 3A–3D are a series of enlarged, fragmentary top perspective views of a maintenance end the band saw apparatus of FIG. 2 illustrating pivotal movement of the saw carriage assembly for maintenance access.

FIGS. 4 is a side elevation view of the maintenance end of the band saw apparatus of FIGS. 3A–3D.

FIGS. 5A–5C are a series of fragmentary, top plan views of the band saw apparatus taken substantially along the plane 5—5 in FIG. 4.

FIG. 6 is an enlarged, fragmentary side elevation view of a maintenance end of the band saw apparatus of FIG. 4 illustrating mounting of an upper support beam to a cantilevered central beam of the cutting table.

FIG. 7 is an exploded, top perspective view of an alternative embodiment of the band saw apparatus of the present invention employing support rods to support the central beam.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 2 through 3D, where the present band saw apparatus, generally designated 30, is illustrated having a base frame 31 and a cutting table 32 supported on top of the frame to provide a generally planar cutting surface 33. A blade receiving slot, generally designated 34 (FIGS. 3A–3D), extends along a longitudinal direction of cutting table 32 from a first end 35 of table 32 to and terminating at a second end 36 thereof. The band saw apparatus of the present invention further includes a saw carriage assembly, generally designated 37 (FIGS. 3A–3D), which includes a saw arm assembly 40 having at least two spaced, aligned wheels 41, 41' (i.e., upper wheel and lower wheel, respectively) rotatably mounted thereto. A continuous loop bandsaw blade 43 is mounted to and distends between aligned wheels 41, 41' (FIG. 3D) to form a cutting stretch which extends through receiving slot 34. A carriage guide assembly 44 is mounted adjacent cutting table 32 which extends substantially therealong from the first end to the second end of the table to selectively guide movement of the carriage assembly along the cutting table. A carriage support frame 42 is movably mounted to guide assembly 44 which enables selective, relative reciprocating movement of either saw arm assembly 40 or cutting table 32 longitudinally therealong. This permits the cutting stretch of blade 43 to move along table slot 34.

In accordance with the present invention, bandsaw apparatus 30 further includes a coupling device, generally designated 45, which movably couples saw arm assembly 40 to support frame 42 for movement of the saw arm assembly between a cutting position (FIGS. 3A–3C, 5A and 5B) and a maintenance access position (FIGS. 3D and 5C). In the cutting position, saw carriage assembly 37 can reciprocate, during the cutting stroke, between the first end and the second end of cutting table 32 (FIG. 5A, shown in phantom and solid lines). In the maintenance access position, when carriage assembly 37 is positioned at the table second end 36, the saw arm assembly can be moved away from cutting table 32 which further moves bandsaw blade 43 to a position outwardly of slot 34 to perform maintenance to the blade and saw arm assembly components.

Accordingly, it is an important feature of the apparatus and method of the present invention that saw arm assembly 40, and hence, blade 43 can be moved or positioned away from cutting table 32 and out of slot 34 by an amount sufficient to escape the slot and the cutting table to enable maintenance access to the wheels and the blade. Contrary to the prior art band saw apparatus, the present invention simplifies blade replacement, and further enables increased access to drive wheels 41, 41' (FIG. 3D). Hence, maintenance downtime can be decreased, while productivity can be increased.

In the preferred embodiment, guide assembly 44 includes a horizontally extending guide rail 46 upon which carriage support frame 42 slidably engages for guided, precision powered movement of saw arm assembly 40 linearly along cutting table 32. Further, a linear bearing and guide rail (not shown) may be included extending longitudinally proximate receiving slot 34 to reduce vibration at blade 43. This linear bearing and bearing guide rail, mounted between saw arm assembly 40 and base frame 31, provides additional guiding stability of saw arm assembly 40 along the slot.

A drive screw or ball screw 47, commonly known in the field, is coupled between guide rail 46 and support frame 42 which selectively moves carriage assembly 37 along the rail. It will be appreciated that the saw carriage may also be moved by a long stroking cylinder or pulled by a chain. As saw carriage assembly 37 selectively reciprocates between the cutting table first end 35 and second end 36, rotating blade 43 is moved longitudinally along receiving slot 34 of cutting table 32 to perform cutting of a workpiece (not shown).

The length dimension of guide rail 46 must be sufficient to protrude or extend past an end of the cutting table where the maintenance is to be performed. As shown in FIGS. 3 and 5, guide rail 46 extends beyond the second end 36 of cutting table 32 enabling saw carriage assembly 37 to be positioned past second end 36. Therefore, when saw carriage assembly 37 is guided to this end of guide rail 46, saw blade 43 is positioned substantially out of engagement with receiving slot 34 (FIGS. 3C and 5B). In this position at a maintenance end of guide rail 46, saw arm assembly 40 can be further moved to the maintenance access position for maintenance access.

It will be appreciated that when the above-mentioned linear bearing and bearing guide rail are employed, the length of guide rail 46 must be sufficient to move the saw carriage assembly clear of the linear bearing or the guide rail. Further, the present invention could provide a maintenance access position at either end of the cutting table.

During normal cutting operation of saw carriage assembly 37 along guide assembly 44 (i.e., the cutting stroke), saw arm assembly 40 will be prevented from moving to the maintenance access position for exposure of the components, as will be discussed below. Such an occurrence may cause extensive damage to the unit, and more importantly, subject the saw operator to a potentially dangerous situation.

Further, the band saw apparatus of the present invention preferably includes a base door 51 pivotally mounted to base frame 31 which when closed, precludes movement of saw carriage assembly 37 to the maintenance end of guide rail 46. Base door 51 can either physically prevent movement of the saw carriage assembly to the maintenance end position, or a sensor or switch device (not shown) may be provided which detects the closure of door 51, and/or the position of the saw carriage relative guide rail 46. In either situation, when door 51 is closed (FIGS. 3A and 5A), saw carriage assembly 37 cannot move past the door toward the maintenance end of guide rail 46.

Base door 51 is movably mounted to cutting table 32 through a hinged mounting device 52 for preferable pivotal movement about a generally vertical axis between a closed position and an opened position. In the closed position (FIGS. 3A, 4 and 5A), base door 51 supports second end 36 of table 32 (to be discussed in greater detail below), while in the opened position (FIGS. 3C, 3D, 5B and 5C), saw arm assembly 40 is permitted to move to the maintenance end position of guide rail 46. Hence, as will be discussed below, base door 51 could be provided by other removable support or the like which support the end of the table in the closed position.

In the opened position, base door 51 is opened to a position away from contact with saw carriage assembly 37 to allow movement thereof to the maintenance end of guide rail 46. The hinge point of mounting device 52 is preferably positioned underneath guide rail 46 at the second end of cutting table 32 so base door 51 can be moved sufficiently away from saw arm assembly 40. As best viewed FIGS. 3C, 5B and 5C, in the opened position, base door 51 is generally aligned longitudinally in a direction parallel with the movement of saw carriage assembly 37 along guide assembly 44. As saw carriage assembly 37 moves past door 51 and beyond second end 36 to the maintenance end of guide rail 46, saw blade 43 is moved out of receiving slot 34.

To removably lock the base door in the closed position, a door latch device 53 is coupled between base door 51 and base frame 31 to removably latch base door 51 to base frame 31 (FIG. 3A). Latch device 53 may be provided by any latch mechanism such as a latch pin, locking cylinder or any other securing device.

In accordance with the present invention, once door 51 is moved to the opened position, saw carriage assembly 37 can be moved along guide rail 46 to the maintenance end. Subsequently, saw arm assembly 40 may be further moved to the maintenance access position for completion of scheduled maintenance. Preferably, movement of the saw arm assembly between the cutting position and the maintenance access position is pivotal. As shown in FIG. 3D and 5C, coupling device 45 pivotally swings the components of arm assembly 40, as a unit, away from table 32. Accordingly, blade 43 is moved out of receiving slot 34 so that saw arm assembly 40 can be moved to the maintenance access position.

Saw arm assembly 40 generally includes an upstanding column 54 formed to support an upper housing 55 at an upper portion thereof, and a lower housing 55' mounted to a lower portion of the column. Upper housing 55 is dimensioned to rotatably support and enclose upper drive wheel 41, while lower housing 55' is dimensioned to rotatably support and enclose lower drive wheel 41' therein. Further, a pair of blade guide assemblies 56, 56' (FIG. 3C) are supported on upstanding column 54 between the cutting stretch.

As best viewed in FIGS. 3D and 5C, upper housing 55 and lower housing 55' each includes a movable cover 57, 57' movably mounted thereto for maintenance access to the respective wheel and for replacement of blade 43. Hence, when saw arm assembly 40 is in the maintenance access position, upper cover 57 and a lower cover 57' each can be moved from a covered position, covering upper wheel 41 and lower wheel 41', respectively, and an uncovered position, providing access to upper wheel 41 and lower wheel 41'.

In the preferred form, both wheel covers 57, 57' are pivotally mounted to upper housing 55 and lower housing 55', respectively, in an orientation pivotally moving the respective covers away from cutting table 32, when saw arm assembly is in the maintenance access position (FIGS. 3D, 5C). Hence, each wheel cover 57, 57' is pivotally mounted to a respective housing 55, 55' through a hinge member. These hinge members enable continuous loop blade 43 and drive wheels 41, 41' to be openly accessed without the interference of the cutting table or the like, a problem inherent in the prior art band saw assemblies.

Coupling device 45, which pivotally couples the saw arm assembly to the carriage support frame, is preferably provided by an upper hinge device and a lower hinge device (not shown). Accordingly, coupling device 45 enables saw arm assembly 40 to pivot away from cutting table 32 from the cutting position to the maintenance access position. Further, to prevent this inadvertent pivoting of the saw arm assembly, coupling device 45 includes a carriage latch mechanism 50 (FIGS. 5A and 5B) coupled between saw arm assembly 40 and carriage support frame 42 to removably lock the saw arm assembly in the cutting position. Latch mechanism 50 may be provided by a latch pin or other similar removable latching device.

To allow lower housing 55' to freely reciprocate beneath cutting table 32, base frame 31 provides an elongated channel 58 (FIG. 2) for sliding receipt of the lower housing therein. Cutting table 32 includes a cantilevered a central beam member 60 positioned over channel 58 and atop base frame 31 for support. In the preferred embodiment, the first end of the longitudinally extending central beam 60 is fixedly mounted to base frame 31, while the second end of cutting table central beam is movably supported, vertically, by base door 51 during movement of saw carriage assembly 37 between the first and the second end. This arrangement provides leveling capabilities for the table cutting surface to conform with manufacturers tolerances. Moreover, by suspending central beam 60 at opposite ends thereof atop the base frame and the door, lower housing 55' of saw carriage assembly 37 can continuously reciprocate through the cutting stroke in an uninterrupted manner.

Adjacent cantilevered central beam 60 is a fixed beam member 61 of cutting table 32 which is rigidly or fixedly supported at both ends atop base frame 31. Leveling of this fixed beam of the cutting table is provided by shims or the like which can be performed by the manufacturer. Hence, as will be described below, cantilevered central beam 60 of cutting table 32 can be leveled to conform with the adjacent fixed beam so that the central beam and the fixed beam cooperate to provide a substantially planar cutting surface 33.

FIG. 3A illustrates that central beam 60 preferably includes a heavy duty underlying support beam 62 for increased support thereof. Support beam 62 extends from the cutting table first end to the second end whereby one end of the beam is fixedly mounted to base frame 31, while the opposite end thereof is movably supported by base door 51.

To provide the movable or adjustable vertical support of central beam 60, base door 51 includes a table supporting mechanism, generally designated 64, selectively movable between an engaged position and a disengaged position. In the engaged position (FIGS. 3A, 4 and 5A), supporting mechanism 64 supportably contacts the underside of the support beam 62 to vertically support the cutting table at the second end thereof. It will be understood, however, that the supporting mechanism can only be moved to the engaged position when base door 51 is situated in the closed position.

In the disengaged position (FIGS. 3B–3D, 5B and 5C), in contrast, table supporting mechanism 64 disengages supportive contact with support beam 62 which enables base door 51 to move to the opened position. The base door, thus, can be positioned in either the opened or closed position when support mechanism 64 is moved to the disengaged position. When base door 51 is in the opened position, the second end of cantilevered central beam 60 still requires vertical support, which will be described in detail below.

In the preferred embodiment, table supporting mechanism 64 is provided by two spaced-apart hydraulic leveling cylinders 65, 65', each having axially adjustable piston rods 66, 66', respectively, which releasably contact an underside surface of support beam 62 for vertical support thereof. Accordingly, by selectively adjusting the vertical height or displacement of the piston rods, the central beam of cutting table 32 may be vertically leveled.

It will be understood that while leveling cylinders 65, 65' are preferably hydraulically driven pistons, these vertical supports may be pneumatically or mechanically inclined as well without departing from the true nature and spirit of the present invention. Further, while the table supporting mechanism is preferably located in the swing-away base door, the location of the supporting mechanism could be independent from the base door. In this arrangement, the supporting mechanism would either be situated inwardly or outwardly of the base door. Vertical support of central beam second end, however, must be provided, as well as clearance from saw carriage assembly 37 for unimpeded movement of lower housing 55' beneath cutting table 32 between the cutting table first end 35 and the second end 36 thereof.

As mentioned above, when base door 51 is moved to the opened position, cantilevered central beam 60 must be vertically supported by means other than supporting mechanism 64. In the preferred embodiment, this additional support is provided by an elongated support bar 67 transversely extending across fixed beam 61 and cantilevered central beam 60 of cutting table 32 near the table second end 36. Since fixed beam 61 of table 32 is fixedly supported by base frame 31 at both ends thereof, support bar 67 functions as a support bracket when fixedly mounted to both the central beam and to the fixed beam for vertical support of the central beam.

Support bar 67 must be installed prior to movement of the support mechanism to the disengaged position, and before door 51 can be moved to the opened position. Further, since support bar 67 extends across blade receiving slot 34, carriage assembly must be moved proximate table second end 36 at an escape position (FIGS. 3B and 5A) so that blade 43 can be positioned between closed base door and the to be installed support bar 67. Otherwise, support bar 67 would impede movement of carriage assembly 37 to the maintenance end of guide rail 46.

To rigidly mount support bar 67 to fixed beam 61 and central beam 60, as shown in FIGS. 2 and 6, each beam includes a plurality of inverted Tee slots 70 extending longitudinally along the cutting table. Each slot 70 is formed for sliding receipt of a rectangular-shaped gib 71 therein. Each gib 71 includes a threaded hole formed to threadably receive a retaining bolt 72 extending through a top portion of support bar 67. Preferably, one gib 71 is provided for each beam for anchoring of the support bar thereto. As each retaining bolt 72 is threaded into the corresponding gib, the support bar is tightened against the corresponding beam so that central beam 60 can be suspended from fixed beam 61 at the cutting table second end 36.

Alternatively, as shown in FIG. 7, the second end 36 of central beam 60 may be supported by horizontally extending central beam support rods 73 and 73'. Apertures 74, 74' extending through base frame 31 are formed and dimensioned for sliding receipt of a corresponding support rod 73 and 73' therethrough. Further, support beam 62 includes passages 75, 75' which are co-axially aligned with apertures 74, 74', respectively, and formed for receipt of support rods 73, 73' therethrough. Accordingly, upon insertion of support rods 73, 73' through apertures 74, 74' and passages 75, 75', respectively, central beam 60 can be vertical supported through coupling to the base frame 31.

Upon movement of saw carriage assembly 37 to the maintenance access position, the first set of support rods 73 may be removed so that the saw blade (not shown) may enter the "capture zone" 76 between the first set of support rods 73 and the second set of support rods 73'. Subsequently, the first set of support rods 73 may be reinserted into passages 74 of support beam 62, which then enables removal of the second set of support rods 73'. Hence, the saw blade and the carriage assembly can then be moved to the maintenance access position.

It will be appreciated, as shown in FIG. 7, that the first end of central beam 60 may be supported in a manner similar to the support rods 73, 73' at the second end of the cutting table without departing from the present invention.

After maintenance of the saw carriage components is performed, carriage assembly 37 is moved back from the maintenance access position to the cutting position so that blade 43 reenters receiving slot 34. Subsequently, base door 51 is pivotally moved from the opened position to the closed position, and cylinders 51 are reenergized to support central beam 60. Support bar 67 can then be removed.

From the description of the present apparatus, it will be understood that the method for accessing a continuous loop bandsaw blade 43 movably mounted to saw carriage assembly 37 of bandsaw apparatus 30 comprises the step of moving the saw carriage assembly away from base frame 31 in a manner moving blade 43 out of blade receiving slot 34 and away from base frame 31 by an amount sufficient for maintenance access to blade 43.

Preferably, the moving step is accomplished by pivoting carriage assembly 37 about a generally vertical axis. Further, before the moving step, the method of the present invention includes the step of passing saw carriage assembly 37 longitudinally along guide assembly 44 and beyond second end 36 of cutting table 32. Finally, before the passing step, opening base door 51 movably mounted to base frame 31, proximate table second end 36, from the closed position, blocking movement of saw carriage assembly 37 along guide assembly 44 to a position beyond second end 36, to the opened position, permitting saw carriage assembly 37 to move along guide assembly 44 and beyond second end 36.

What is claimed is:

1. A method of removing a continuous loop saw blade from a bandsaw apparatus comprising the steps of:

longitudinally moving one of a saw carriage assembly and a bandsaw cutting table having a longitudinally extending saw blade-receiving slot therein, said saw carriage assembly having said saw blade movably mounted thereto with said saw blade extending through said blade-receiving slot and looping down under a central portion of the bandsaw cutting table and back up an outer side of the central portion, and said blade-receiving slot extending in said cutting table to an opening at one end of said bandsaw cutting table, said longitudinally moving step being continued while said saw blade is mounted on said saw carriage assembly until said saw blade is positioned out of said saw blade-receiving slot at said opening to a position providing access to said saw blade for passage of said saw blade from around the central portion of the bandsaw cutting table and removal from said saw carriage assembly; and while said saw blade is positioned out of said saw blade-receiving slot, removing said saw blade from said saw carriage assembly.

2. A method of removing a continuous loop saw blade from a bandsaw comprising the steps of:

longitudinally moving one of a saw carriage assembly and a bandsaw cutting table having a longitudinally extending saw blade-receiving slot therein, said saw carriage assembly having said saw blade movably mounted thereto with said saw blade extending through said blade-receiving slot, and said blade-receiving slot extending in said cutting table to an opening at one end of said bandsaw cutting table, said longitudinally moving step being continued until said saw blade is positioned out of said saw blade-receiving slot at said opening to a position providing access to said saw blade for removal from said saw carriage assembly;

while said saw blade is positioned out of said saw blade-receiving slot, removing said saw blade from said saw carriage assembly;

said longitudinally moving step is accomplished by moving said saw carriage assembly relative to said cutting table; and after said longitudinally moving step, rotating said saw carriage assembly about a vertically oriented axis.

3. A method of removing a continuous loop saw blade from a bandsaw apparatus comprising the steps of:

longitudinally moving one of a saw carriage assembly and a bandsaw cutting table having a longitudinally extending saw blade-receiving slot therein, said saw carriage assembly having said saw blade movably mounted thereto with said saw blade extending through said blade-receiving slot, and said blade-receiving slot extending in said cutting table to an opening at one end of said bandsaw cutting table, said longitudinally moving step being continued while said saw blade is mounted on said saw carriage assembly until said saw blade is positioned out of said saw blade-receiving slot at said opening to a position providing access to said saw blade for removal from said saw carriage assembly; and while said saw blade is positioned out of said saw blade-receiving slot, removing said saw blade from said saw carriage assembly.

4. The method as defined in claim 3 wherein, said saw carriage assembly includes a saw arm assembly having at least two spaced-apart, aligned wheels rotatably mounted thereto upon which said saw blade is distended therebetween to form a cutting stretch extending through said blade-receiving slot, and a support frame movably mounted to said bandsaw apparatus for selective reciprocating movement of one of said saw arm assembly and said cutting table longitudinally to move said cutting stretch of said blade along said blade-receiving slot.

5. The method as defined in claim 3, and the step of:

after said longitudinally moving step, pivoting said saw arm assembly about a coupling device provided on said bandsaw apparatus to a maintenance access position.

6. The method as defined in claim 3 wherein, said longitudinally moving step is accomplished by moving said saw carriage assembly relative to said cutting table.

7. A method of removing a continuous loop saw blade from a bandsaw comprising the steps of:

longitudinally moving one of a saw carriage assembly and a bandsaw cutting table having a longitudinally extending saw blade-receiving slot therein, said saw carriage assembly having said saw blade movably mounted thereto with said saw blade extending through said blade-receiving slot, and said blade-receiving slot extending in said cutting table to an opening at one end of said bandsaw cutting table, said longitudinally moving step being continued until said saw blade is positioned out of said saw blade-receiving slot at said opening to a position providing access to said saw blade for removal from said saw carriage assembly;

while said saw blade is positioned out of said saw blade-receiving slot, removing said saw blade from said saw carriage assembly; and said cutting table is substantially horizontally oriented, said saw blade has a cutting stretch which is substantially vertically oriented, and said longitudinally moving step is accomplished by moving said saw carriage assembly and said saw blade longitudinally substantially parallel to said saw blade-receiving slot until said saw blade is proximate said opening at said one end of said table, and thereafter rotating said saw carriage assembly about a vertical axis to provide access to said saw blade for removal.

8. The method as defined in claim 7 wherein, said cutting table is substantially horizontally oriented, said saw blade has a cutting stretch which is substantially vertically oriented, and said longitudinally moving step is accomplished by moving said saw carriage assembly and said saw blade longitudinally substantially parallel to said saw blade-receiving slot until said saw blade is proximate said opening at said one end of said table, and thereafter rotating said saw carriage assembly about a vertical axis to provide access to said saw blade for removal.

9. The method as defined in claim 8 wherein, before said removing step, opening a base door movably mounted to said bandsaw apparatus proximate said opening in said end of said cutting table to unblock movement of said saw carriage assembly along said guide assembly to a position beyond said end of said cutting table.

* * * * *